(12) United States Patent
Viele

(10) Patent No.: US 9,048,775 B2
(45) Date of Patent: Jun. 2, 2015

(54) H-BRIDGE FOR COMBINED SOLENOID AND PIEZO INJECTION CONTROL

(71) Applicant: National Instruments Corporation, Austin, TX (US)

(72) Inventor: Matthew Viele, Florissant, CO (US)

(73) Assignee: National Instruments Corporation, Austin, TX (US)

( * ) Notice: Subject to any disclaimer, the term of this patent is extended or adjusted under 35 U.S.C. 154(b) by 152 days.

(21) Appl. No.: 13/934,811

(22) Filed: Jul. 3, 2013

(65) Prior Publication Data

US 2014/0117882 A1     May 1, 2014

Related U.S. Application Data

(60) Provisional application No. 61/720,054, filed on Oct. 30, 2012.

(51) Int. Cl.
| | | |
|---|---|---|
| *H02P 25/02* | (2006.01) | |
| *F02M 51/00* | (2006.01) | |
| *F02D 41/20* | (2006.01) | |

(52) U.S. Cl.
CPC ........... *H02P 25/027* (2013.01); *F02M 51/005* (2013.01); *F02D 2041/2072* (2013.01); *F02D 41/20* (2013.01); *F02D 41/2096* (2013.01); *F02D 2041/2006* (2013.01); *F02D 2041/201* (2013.01)

(58) Field of Classification Search
CPC ..................................... H02P 25/027
USPC ........... 318/4, 3, 400.29, 400.26, 400.01, 700
See application file for complete search history.

(56) References Cited

U.S. PATENT DOCUMENTS

| | | | |
|---|---|---|---|
| 5,621,604 A | 4/1997 | Carlson | |
| 5,818,178 A * | 10/1998 | Marumoto et al. | ...... 318/400.32 |
| 7,525,234 B2 | 4/2009 | Martin | |
| 7,640,918 B2 | 1/2010 | Perryman et al. | |
| 8,576,016 B2 | 11/2013 | Czimmek | |
| 2010/0258099 A1 | 10/2010 | Andersson et al. | |

FOREIGN PATENT DOCUMENTS

| | | |
|---|---|---|
| CN | 201326464 Y | 10/2009 |
| EP | 1400676 B1 | 12/2009 |

OTHER PUBLICATIONS

Tom Denton; "Electronic Fuel-Injection Systems"; Automotive Technician Training; Jan. 5, 2007; pp. 455-473.

* cited by examiner

*Primary Examiner* — David S Luo
(74) *Attorney, Agent, or Firm* — Meyertons Hood Kivlin Kowert & Goetzel, P.C.; Jeffrey C. Hood

(57) ABSTRACT

An engine system may include a specified number of individual injectors, and an engine control unit (ECU) having a specified number of pins coupling to the individual injectors. The ECU may include a controller capable of dynamically switching between different multiplexing configurations, with each multiplexing configuration coupling individual injectors across corresponding pairs of pins. Each pin may internally couple to one half of an H-bridge structure, with an injector coupled across two pins thereby completing a full H-bridge structure, providing the flexibility to achieve combined solenoid and Piezo injection control. Specifically, each pin may be internally coupled to a low-side switch and a set of high-side switches, and the switches may be operated according to the dynamically selected multiplexing configuration and the type of injection control to perform any one or more of unipolar solenoid, unipolar Piezo, bipolar solenoid, and bipolar Piezo injection control, depending on the injector type used.

25 Claims, 13 Drawing Sheets

On Phase

Off Phase

Stopped Phase

H-BRIDGE FOR COMBINED SOLENOID AND PIEZO INJECTION CONTROL

PRIORITY CLAIM

This application claims benefit of priority of U.S. provisional application Ser. No. 61/720,054 titled "H-bridge for Combined Solenoid and Piezo Injection Control", which was filed on Oct. 30, 2012, and which is hereby incorporated by reference in its entirety as though fully and completely set forth herein.

BACKGROUND OF THE INVENTION

1. Field of the Invention

This invention relates generally to engine controllers and, more particularly, to an H-bridge topology for combined solenoid and Piezo injection control.

2. Description of the Related Art

Most present day internal combustion engines, or other type of automotive or general-purpose engines are controlled using engine control units (ECUs). Typically, an ECU is an electronic, oftentimes computerized or computer-directed control unit operated to read feedback values from a number of sensors situated within and around the engine (e.g. in the engine bay for vehicles), and interpret the feedback data using multidimensional performance maps and computational models, e.g. through various look-up tables. The ECU is further operated to control the engine according to the interpreted data by adjusting a series of actuators that are either functional parts of the engine or part of control circuitry also situated near the engine (again, for example in the engine bay for vehicles), to ensure optimum running and operation of the engine. Computerized ECUs can be programmable, which allows for efficiently adapting ECUs to different types of engines and/or in cases aftermarket modifications are made to an engine. Operations and/or characteristics that can be controlled by an ECU include air/fuel ratio for fuel injection engines, ignition and injection timing, idle speed, variable valve timing, valve control, revolutions limit, water temperature correction, transient fueling, gear control, and others.

Modern ECUs oftentimes use a microprocessor to process the sensor inputs from the engine in real time, and include the necessary hardware and software (or firmware) implementing all ECU functionality. The hardware typically includes electronic components, e.g. the CPU, on a printed circuit board, ceramic substrate or a thin laminate substrate. The software/firmware can be stored in the microcontroller/CPU or other integrated circuits situated on the circuit board(s), typically in some programmable or flash memory, allowing the CPU to be re-programmed by uploading updated code. In some instances reprogramming is achieved by replacing some of the memory chips, though this has become significantly less common in the past fifteen years. Advanced ECUs can receive inputs from various sources, and control other parts of the engine, while communicating with transmission control units or directly interfacing with electronically-controlled automatic transmissions, traction control systems, and the like. Communication between these devices is oftentimes achieved through a specialized automotive network called Controller Area Network (CAN). Modern ECUs often include features such as cruise control, transmission control, anti-skid brake control, anti-theft control, etc.

ECUs are used to control passenger car engines, which are most common, as well as industrial engines, which may not be quite as common. Semi-trucks, busses, construction equipment, generators, ships, etc. are usually built around large diesel engines. These engines vary from one (1) to sixteen (16) cylinders depending on the application with the most common being six (6) cylinders, although engines with greater than sixteen cylinders do exist, but they are rare. Electronic engine controllers first appeared in the 1960s (Bosch D-Jetronic) as pure analog devices. By 1981, every GM car in the US had an electronic ECU with an 8-bit processor. ECU control of industrial diesel engines lagged behind because the engines did not have to meet tough emissions standards. However, starting in the mid 1990s, emission regulations were imposed, which required electronic controls. The number of actuators to control, and the complexity of the controller (ECU) increased with each round of regulation, as the automotive electronics industry matured.

Companies such as Driven have traditionally manufactured "research engine controllers", which are typically used in the early development stages of new concept engines, as opposed to standard engine controllers that are used to control operational engines, for example in automobiles. Many of these ECUs are built using National Instruments (NI) controller hardware and LabVIEW™ software. In addition, there exist a large number of I/O modules specific to various different engines. Overall, traditional modular engine controllers and a typical production controller may differ from each other, as production controllers tend to be purpose built for a specific engine type and injector configuration. In order to minimize cost and engine controller requirements from concept to operation, it would be desirable to have ECUs that are as generic and flexible as possible.

Other corresponding issues related to the prior art will become apparent to one skilled in the art after comparing such prior art with the present invention as described herein.

SUMMARY OF THE INVENTION

In one set of embodiments, a variety of improvements are made to engine controllers for both passenger car and industrial engines. An engine control module (ECM) is proposed for an engine controller for advanced diesel engines. The ECM may perform all necessary engine control functions while accommodating a variety of new-concept injectors. In one set of embodiments, a proposed standalone direct injector driver module (SDIDM) may include the power electronics of the ECM, but without a portion of the engine I/O, packaging all features into an industrial form factor. The ECM and SDIDM modules are different from ordinary engine controllers found in current vehicles because they are designed for research and low volume production, with more flexibility than engine controllers found in production vehicles.

In one embodiment, an engine control system may include a number (N) of pins, for coupling to a number (M) of injectors. The engine control system may also include a control unit capable of switching between a number of different multiplexing configurations, with each multiplexing configuration including individual injectors of the M injectors coupled across corresponding pairs of pins of the N pins. Each multiplexing configuration may become an active multiplexing configuration while the control unit is switched to that multiplexing configuration, and the control unit may thereby operate the individual injectors through the corresponding pairs of pins in the active multiplexing configuration. In some embodiments, N is an integer greater than 2, and M is an integer greater than 1.

The multiplexing configuration may be implemented by coupling each pin internally to circuitry that represents one half of an H-bridge structure, which provides the flexibility to achieve combined solenoid and Piezo injection control. Each pin may be internally coupled to a low-side switch and a set of high-side switches, which together make up one half of the H-bridge structure, and the switches may be operated according to a dynamically selected multiplexing configuration to perform any one or more of unipolar solenoid, unipolar Piezo, bipolar solenoid, and bipolar Piezo injection control. Therefore, operation of the switches may also be determined by the type of injection control (i.e. type of injector) used.

Therefore, in one set of embodiments, a drive circuit may include a number (N) of pins where each pin of the N pins may couple to an actuator, and may also include a number (M) of switches. Each pin (of the N pins) may be coupled to a different respective low side switch of the M switches, and also to a different respective set of high side switches of the M switches. The switches may be configured to be selectively operated to control a specified number of actuators according to a multiplexing configuration that defines the connectivity between at least a subset of the N pins and the specified number of actuators, and further according to the actuator type of each actuator. Any pair of pins and the actuator coupled across the pair of pins may together form a respective H-bridge circuit. The switches may be implemented as field effect transistors (FETs) that are controlled through their respective gate terminals.

The actuator type may be any one or more of a 3-phase motor, stepper motor, a hydraulic valve, a pneumatic valve, a unipolar solenoid injector, a unipolar Piezo injector, a bipolar solenoid injector, and/or a bipolar Piezo injector. Furthermore, at least one switch of the different respective set of high side switches may be coupled to a boost power supply to deliver a power boost when the switch is closed. Similarly, at least one switch of the different respective set of high side switches may be coupled to the power terminal of a power supply to deliver steady power when the switch is closed. Accordingly, the respective low side switch may be coupled to the reference terminal of the power supply, which may also be used to provide input power to the boost power supply.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
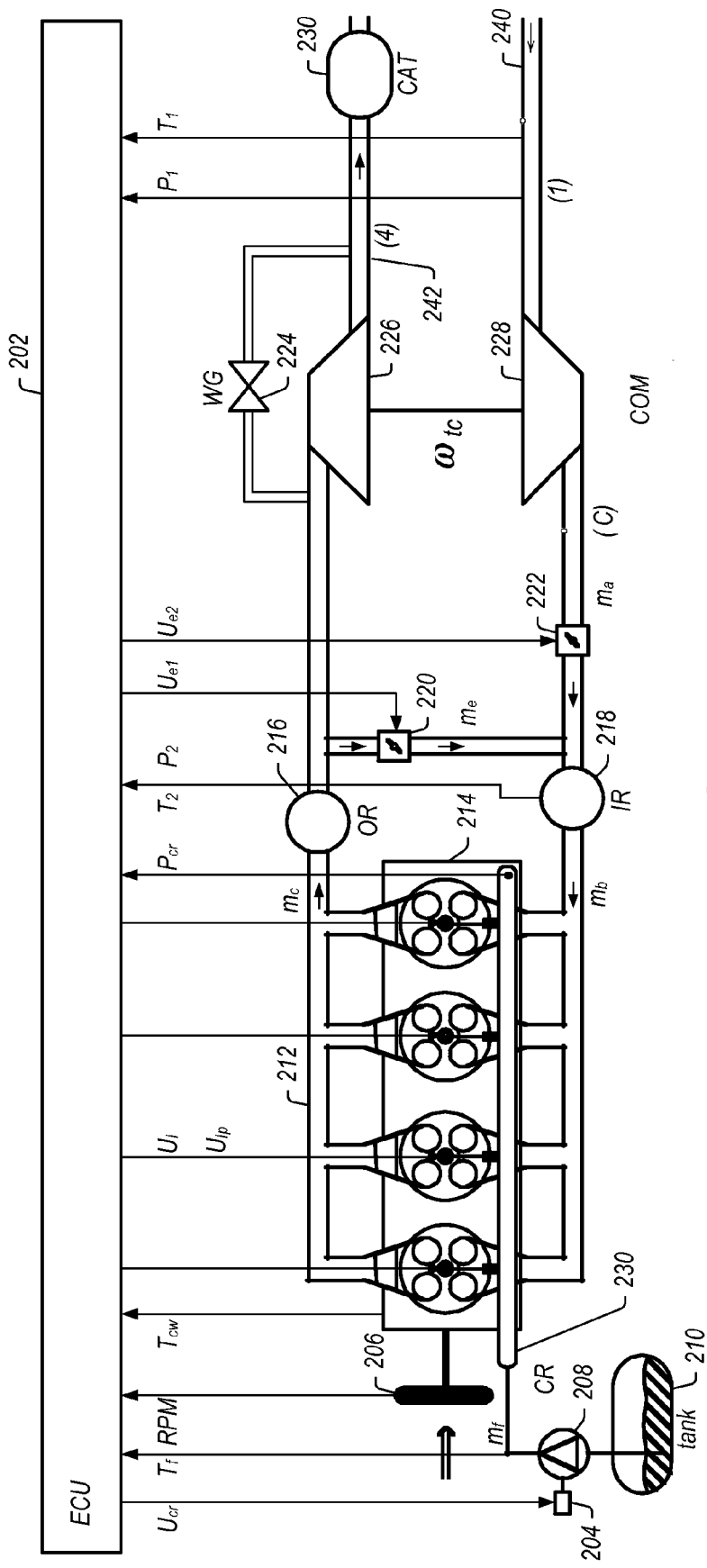
FIG. 1 shows a partial block diagram of one embodiment of a generic engine, and engine control unit (ECU) connections, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE EMBODIMENTS

FIG. 1 shows a schematic diagram of one embodiment of a diesel engine system that includes an engine control unit (ECU) 202 with a subset of the input-output (I/O) used on ECU 202. Fresh air enters through pipe 240 in the direction shown, while the exhaust leaves via pipe 242 through catalyst (CAT) 230. Pressure and temperature are sampled before the compressor (COM) 226/228 in region (1). Air is compressed by the compressor 228/226 in region (C), where it may be gated by a throttle 222. The air is then mixed with a recirculated portion of the exhaust gas (EGR)—which is gated by throttle 220—in the intake manifold (IR) 218, where the pressure and temperature may be sampled as well. The mix of EGR and fresh air is then conveyed to the engine combustion chamber 214. Diesel fuel is pumped from the fuel tank 210 in to the common rail (CR) fuel system 208, from where it is provided to the injectors 230. At the correct engine angle, the fuel injectors 230 are fired by energizing a solenoid or piezo crystal. The resultant fuel burns in the air charge creating power. The cylinders are then emptied into the exhaust manifold 216, from which the contents move to the turbine of the turbocharger 224, and through the after treatment (CAT) 230 into the atmosphere.

Figure 2:
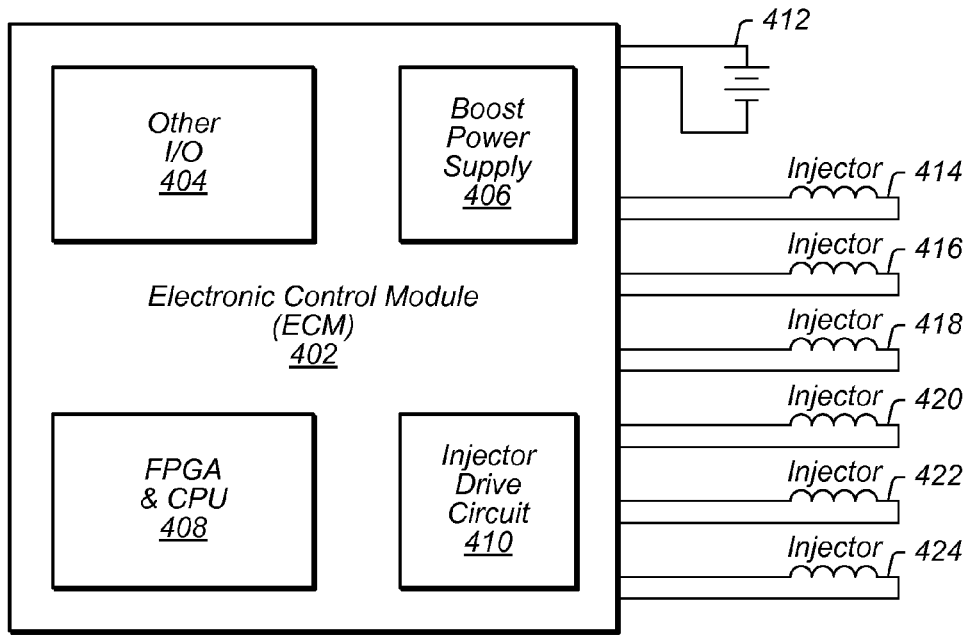
FIG. 2 shows a partial block diagram of one embodiment of an injector driver control module)

In one set of embodiments, a novel electronic control module (ECM) may include functionality that spans the gap between traditional modular engine controllers and a typical production controller. Production controllers tend to be purpose built for a specific engine type and injector configuration, which greatly restricts their use. Embodiments of the ECM may be designed to be as generic and flexible as possible for multipurpose use. A partial block diagram of one embodiment of an ECM 402 is shown in FIG. 2. For purposes of illustration, ECM 402 is shown controlling a set of six injectors 414-424, and is powered by a voltage source 412. ECM 402 includes a control module 408, which may be implemented as a field programmable gate array (FPGA), a central processing unit (CPU), custom logic, or any combination thereof. Control module 408 may provide central control for ECM 402, directing operation of injector drive circuit 410, which acts as the control interface for injectors 414-424. ECM 402 may communicate with other devices, units, and/or controllers via additional input/output (I/O) interface 404. Power to the various blocks and circuit elements within ECM 402 is provided by boost power supply 406. It should be noted that FIG. 2 by no means conveys the entire ECM I/O package, and is meant to show only the major portions of the driver stage used for driving injectors 414-424, for the purposes of illustration.

Figure 3:
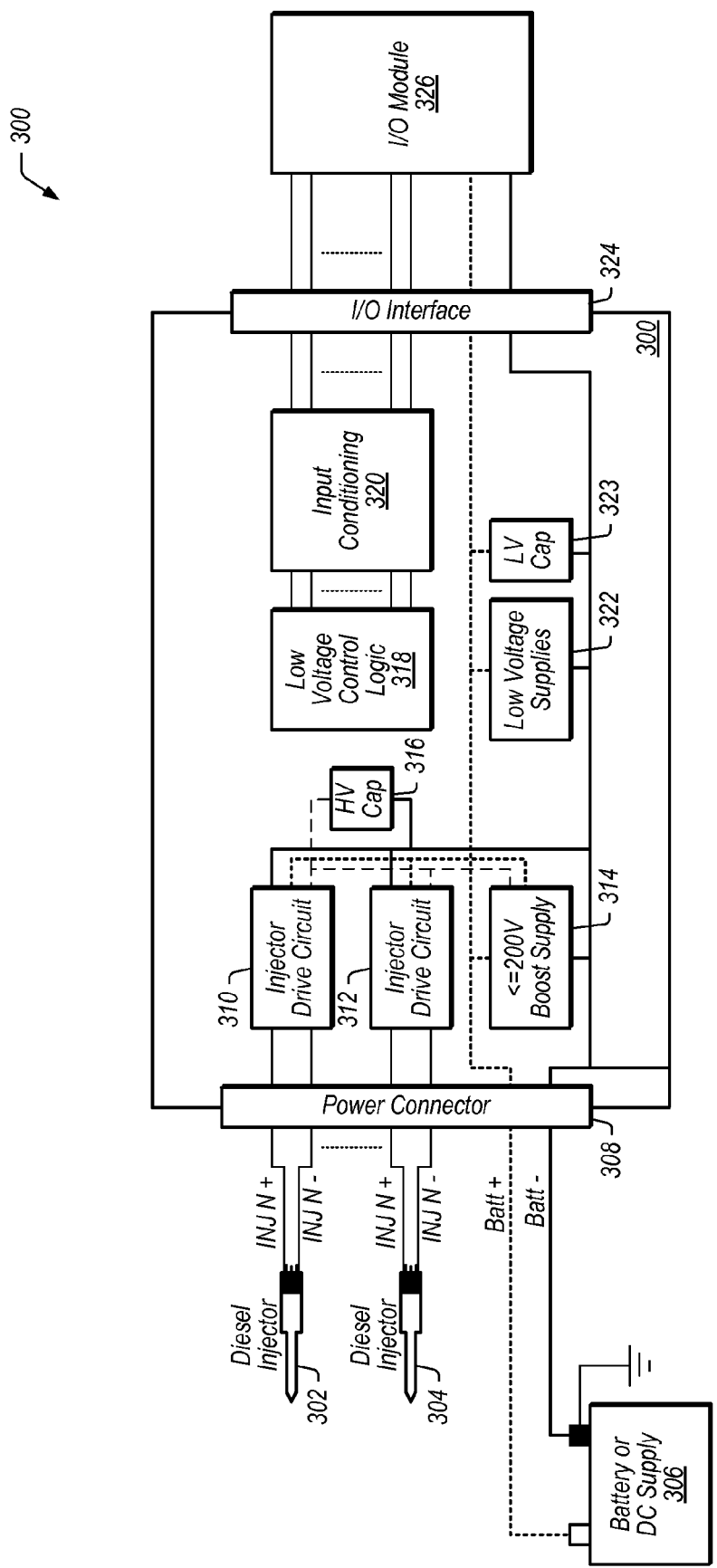
FIG. 3 shows the partial block diagram of one embodiment of a standalone direct injector drive module that doesn't include all the input/output (I/O) functionality of the injector driver control module of FIG. 2.

FIG. 3 shows a partial block diagram of the power electronics for an alternate embodiment of an ECM designed to operate as an injector driver module (IDM) 300. IDM 300 may be packaged into an industrial form factor, and may include similar power electronics to ECM 402, but without the rest of the engine I/O. As shown in FIG. 3, IDM 300 may receive control commands through I/O module 326 via I/O interface 324. The incoming signals may undergo input conditioning in block 320 assisted by low-voltage control logic 318. The battery or DC supply 306 is used to provide power to IDM 300, with the ground terminal 328 of battery 306 coupled to the vehicle chassis on mobile installs, and grounded to earth on stationary installs. Low-voltage supplies 322 (with capacitors 323) and boost supply 314 (with capacitors 316) may both receive power from supply 306. Boost supply 314 provides power to injector drive circuits 310 and 312, which control diesel injectors 302 and 304, respectively, via power connector 308. As seen in FIGS. 2 and 3, ECM 402 may be similar to IDM 300, except it may include more I/O components (e.g. I/O circuits 404) and a processor (e.g. CPU 408), and may generate control signals from the internal logic instead of receiving control commands through and I/O module via I/O interface 324. However, both ECM 402 and IDM 300 differ from ECUs typically found in a car, as ECM 402 and IDM 300 may be used to perform control during engine research with more flexibility than similar controllers built into production vehicles.

Flexible Multiplexing Scheme

In one set of embodiments, ECM 300 and IDM 300 may both include a multiplexing scheme for selecting various control configurations for the injectors (e.g. injectors 414-424 in FIG. 2, and injectors 302-304 in FIG. 3.

In one set of embodiments, ECM 402 may be designed to nominally have six (6) channels, and IDM 300 may be designed to nominally have three (3) channels. The number of channels derives from the design of the injector circuits, which may be implemented in ECM 402 as H-bridge circuits, specifically, six H-bridge circuits (which will be further described below). Similarly, the injector circuits in IDM 300 may be implemented as three H-bridge circuits. If full bipolar mode is not required—which is oftentimes the case—the injector circuits may be multiplexed. For example, a conventional multiplexing scheme may be established in which a common low-side switch (driver) is shared with independent high-side switches (drivers). Six H-bridge circuits may thereby be split into twelve (12) half H-bridge circuits that may be controlled as necessary.

Figure 4:
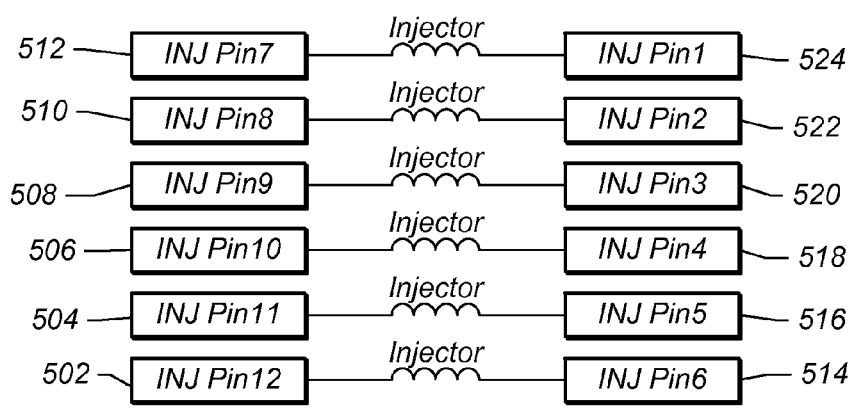
FIG. 4 shows a partial pin diagram of a non-multiplexed injection topology.

An example of the configuration for six channels arranged as twelve H-circuits in a non-multiplexed configuration is shown in FIG. 4. Low-side switches 502-512 may each control one end of a respective injector, while how-side switches 514-524 may each control the other end of their respective injector. While such a configuration may be used in production ECUs, the multiplexing in present day ECUs is fixed, and the ECUs are typically missing hardware that would allow other multiplexing schemes.

Figure 5:
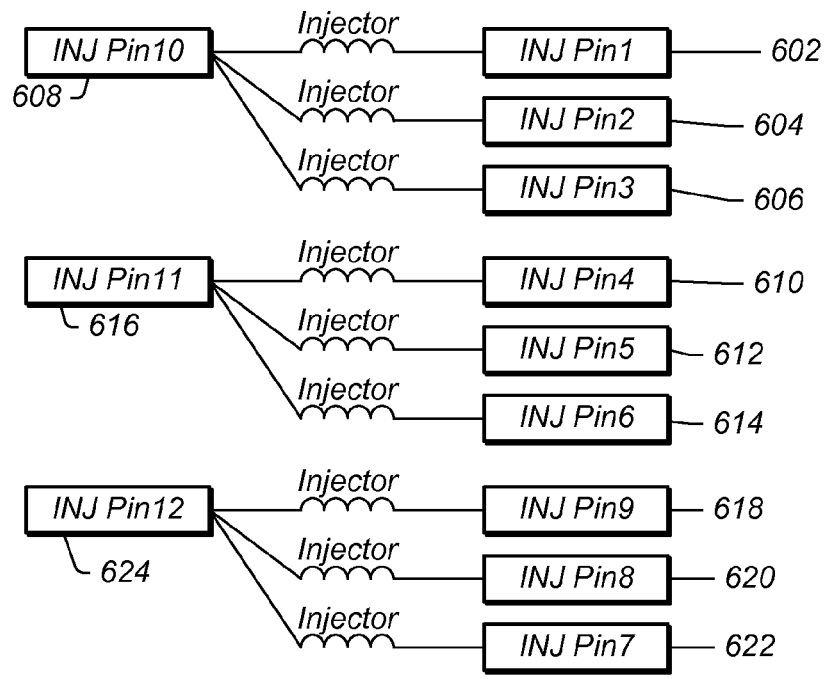
FIG. 5 shows a partial pin diagram of an alternative injection topology with three banks of 3-way multiplexing.

In one set of embodiments, and ECU (or ECM or IDM) may include a structure that allows for multiple multiplexing schemes. For example, in one embodiment, an ECU is implemented with an FPGA-based software configuration that facilitates the easy flexibility to mix and match multiplexing schemes with any combination of pins. FIG. 5 shows an example of the configuration for six channels arranged as twelve H-circuits in a multiplexed configuration in which each one of three common low-side switches is shared with a corresponding three independent high-side switches. Accordingly, low-side switch 608 is shared with high-side switches 602-606, low-side switch 616 is shared with high-side switches 610-614, and low-side switch 624 is shared with high-side switches 618-622. The configuration shown in FIG. 5 therefore represents three banks of 3-multiplexing.

Figure 6:
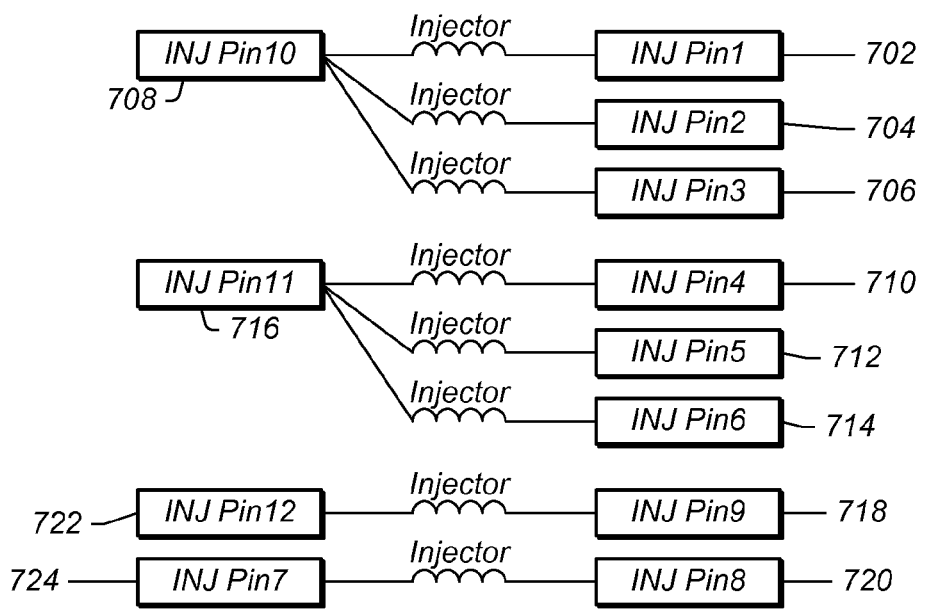
FIG. 6 shows a partial pin diagram of an alternative injection topology with two banks of 3-way multiplexing, and two banks without multiplexing.

The configuration in FIG. 6 shows both multiplexed and non-multiplexed circuits situated in the same box. In the configuration shown in FIG. 6, six channels are again arranged as twelve H-circuits in a configuration of two multiplexed and two non-multiplexed banks. In the configuration shown in FIG. 6, common low-side switch 708 is shared with a corresponding set of three independent high-side switches 702-706, and common low-side switch 716 is shared with a corresponding set of three independent high-side switches and 710-714. In addition low-side switch 722 is operated in conjunction with high-side switch 718, and low-side switch 724 is operated in conjunction with high-side switch 720, in respective non-multiplexed configurations.

Figure 7:
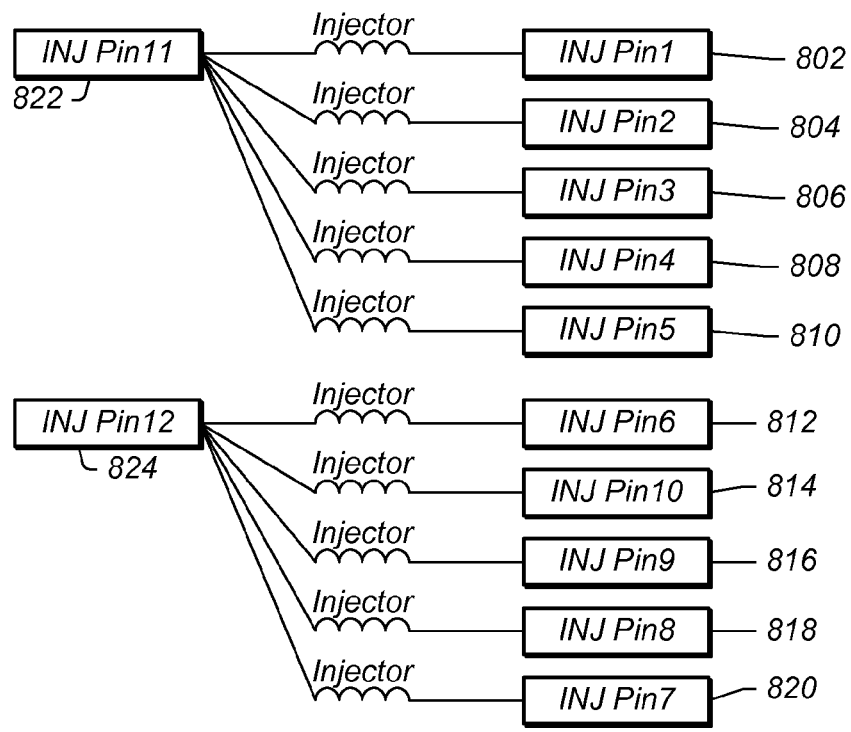
FIG. 7 shows a partial pin diagram of an alternative injection topology with three banks of five-way multiplexing.

FIG. 7 shows another example of the configuration for six channels arranged as twelve H-circuits in a multiplexed configuration in which each one of two common low-side switches is shared with a corresponding five independent high-side switches. Accordingly, low-side switch 822 is shared with high-side switches 802-810, and low-side switch 824 is shared with high-side switches 812-820. The configuration shown in FIG. 5 therefore represents two banks of 5-multiplexing.

Figure 8:
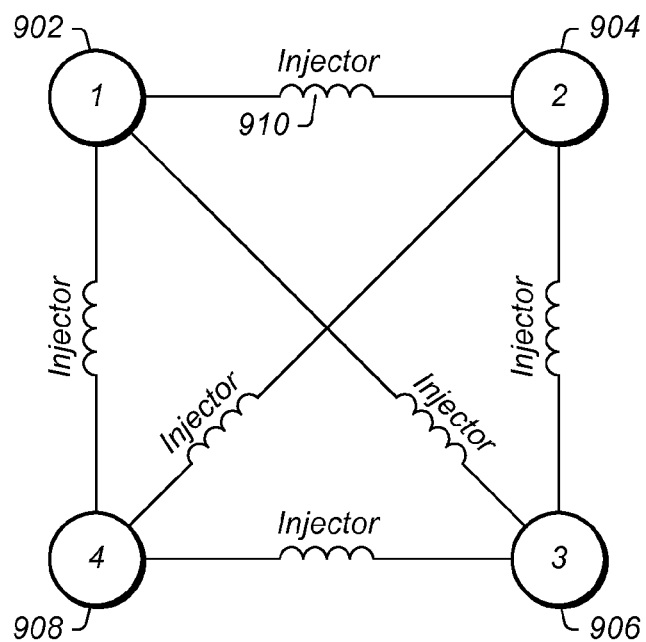
FIG. 8 shows a partial pin diagram of an alternative injection topology with four-to-six cross-multiplexing.

In another set of embodiments, the injector drivers may be cross-multiplexed. This facilitates the use of a considerably larger number of injectors that may be used in all the multiplexing configurations. The number of injectors in this setup is $N=T(n-1)$, where T is the triangular number function $T_n=n*(n+1)/2$, and n is the number of half-H pins used. For example, in a cross-multiplexed configuration that uses four (4) pins, a total of $$3*(3+1)/2=6,$$

i.e. six injectors may be configured for a total of four switches (drivers). An example of this configuration is shown in FIG. 8, where switches (drivers) at pins 908 and 906 may be cross-multiplexed with switches (drivers) at pins 902 and 904, to operate specified ones of the six injectors in various different multiplexing configurations.

Figure 9:
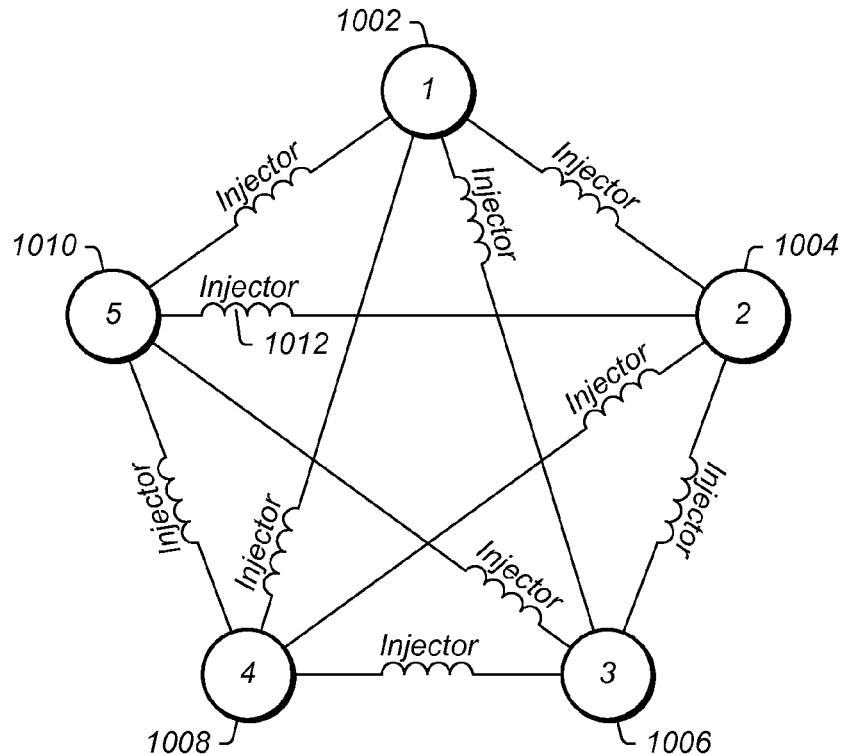
FIG. 9 shows a partial pin diagram of an alternative injection topology with five-to-ten cross-multiplexing.
Figure 10:
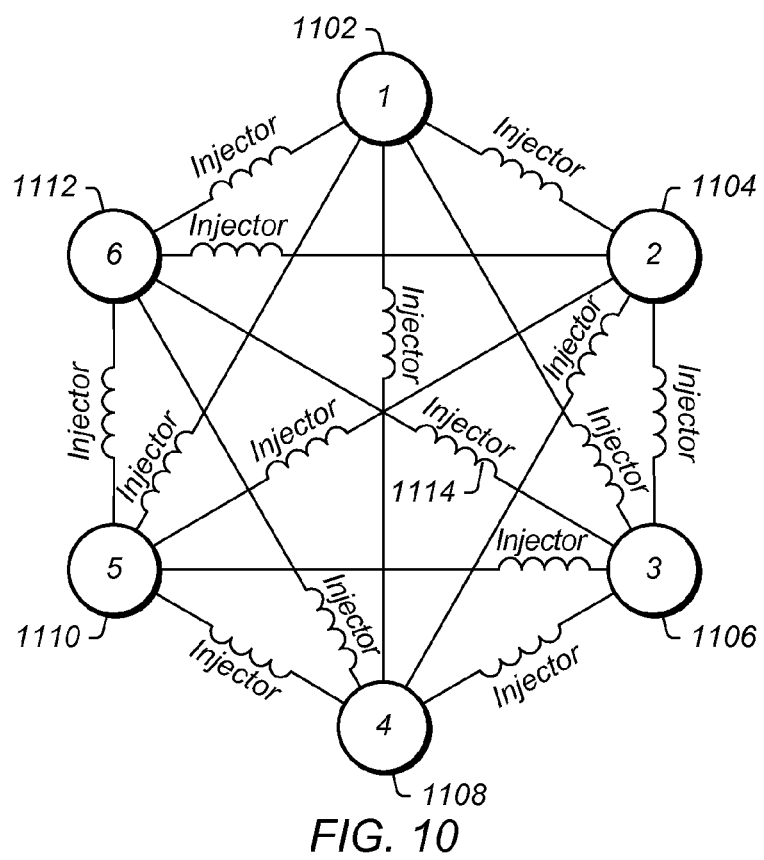
FIG. 10 shows a partial pin diagram of an alternative injection topology with six-to-fifteen cross-multiplexing.

Embodiments for five and six pin configurations are shown in FIG. 9 and FIG. 10, respectively. As seen in FIG. 9, a cross-multiplexed configuration uses five (5) pins to provide multiplexing for a total of $$4*(4+1)/2=10,$$

i.e. ten injectors. Switches 1002-1010 may be cross-multiplexed with each other to operate specified ones of the ten injectors in various different multiplexing configurations. As seen in FIG. 10, a cross-multiplexed configuration uses six (6) pins to provide multiplexing for a total of $$5*(5+1)/2=15,$$

i.e. fifteen injectors. Switches 1102-1112 may be cross-multiplexed with each other to operate specified ones of the fifteen injectors in various different multiplexing configurations.

Table 1 shows the number of injectors that may be actuated (i.e. injectors that may be operated as part of a multiplexing configuration) using a "cross-multiplexing" scheme for a given number of pins. It should be noted that Table 1 is by no means exhaustive and is meant to illustrate the relationship between the number of pins and number of injectors that may be actuated across a pair of pins out of a given number of pins.

TABLE 1

Injector Pin & Injector cross-multiplexing configuration

| | # of Pins | | | | | | | | | |
|---|---|---|---|---|---|---|---|---|---|---|
| | 2 | 3 | 4 | 5 | 6 | 7 | 8 | 9 | 10 | 11 | 12 |
| # of Injectors | 1 | 3 | 6 | 10 | 15 | 21 | 28 | 36 | 45 | 55 | 66 |

Multiplexing may therefore be achieved with software handling switching the correct FETs, reading the correct ADCs, setting the correct DACs, and reading the correct comparators. In alternate embodiments multiplexing may be achieved by externally wiring the injectors in one of the patterns shown in FIGS. 5-10. For example, cross-multiplexing configuration may be implemented using solenoid type injectors. Solenoid type injectors are non-linear, and activation energy for the injector (i.e. the energy at which the injector is activated) is achieved once the current through the injector exceeds a specific threshold level. Cross-multiplexing may therefore be implemented by having the generated activation current through the injectors reach a level that is more than half of the peak current. Overall, the cross-multiplexing configuration may be implemented as described above, where switching between the various multiplexing configurations is performed by executing software algorithm(s), providing an extremely flexible injector-control configuration. For example, in ECM 402, FPGA 408 may implement a software configuration that facilitates mixing and matching multiplexing schemes with any combination of pins. In other embodiments, CPU 408 may execute programming instructions stored in a memory, to mix and match multiplexing schemes with combination of pins according to the principles described above. In all cases, switching between the multiplexing configurations may be performed without making any adjustments to the internal hardware, i.e. without adjusting any hardware but the physical connectivity of the injectors to the pins. It should also be noted, as will also be described in further detail below, that depending on the type of injector being driven, the first pin (of the pair of pins across which the injector is coupled) may have a low-side switch, and the second pin (of the pair of pins) may have a high-side switch, or both pins may have both a high-side switch and a low-side switch. For example, in a multiplexing configuration where a given pair of pins is coupled to only a single injector, both pins may operate in high-side and low-side modes (to drive a bipolar injector, for example).

H-Bridge for Combined Solenoid and Piezo Injection Control

Figure 11A:
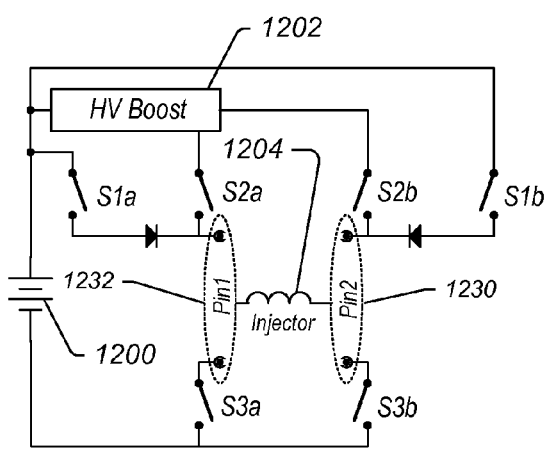
FIG. 11a shows a partial simplified circuit diagram of one embodiment of an H-bridge injector topology.

In one set of embodiments, the flexible multiplexing scheme described above may be implemented through the use of a novel topology for a bipolar injector drive that includes a modified H-bridge arrangement with two legs on each upper side of the H-bridge structure to provide support for both unipolar and bipolar Piezo drive technology. In other words, the novel topology facilitates the use of unipolar and bipolar injectors of both Piezo and solenoid type. FIG. 11a shows a circuit diagram of a simplified topology for the H-bridge switching circuit according to one embodiment. As shown in FIG. 11a, injector 1204 is situated outside of the assembly box, while all the switches S1*a*, S1*b*, S2*a*, S2*b*, S3*a* and S3*b* are inside the drive circuit assembly. In some embodiments, the drive circuit assembly may couple to the high voltage boost circuit 1202 and power source 1200, while in alternate embodiments the high voltage boost circuit 1202 may also be included in the drive circuit assembly. Pin1 1232 and Pin2 1230 of the drive circuit are used to couple to injector 1204, as shown. Injector 1204 may therefore be driven according to the operation of switches S1*a*, S1*b*, S2*a*, S2*b*, S3*a* and S3*b*.

As seen in FIG. 11a, Pin1 1232 and Pin2 1230 are both coupled to respective low-side switches S3*a* and S3*b*, and also coupled to respective sets of high-side switches S1*a*, S2*a*, and S1*b*, S2*b*. Switches S1*a*, S1*b*, S2*a*, S2*b*, S3*a* and S3*b* may be operated according to the selected multiplexing configuration, which was described above in more detail. For example, the controller may have switched to a multiplexing configuration in which injector 1204 is to be operated through Pin1 1232 and Pin1 1230, with injector 1204 being of a type that is either unipolar solenoid, unipolar Piezo, bipolar solenoid, or bipolar Piezo. Thus, switches S1*a*, S1*b*, S2*a*, S2*b*, S3*a* and S3*b* may further be operated according to what type injector 1204 is, as will be further described below. As will be further shown in FIG. 12 and FIG. 13, by splitting the H-bridge structure between pins, that is, by configuring each pin to internally couple—i.e. couple inside the drive circuit within the ECM—to a half-H bridge configuration, various multiplexing configurations are possible to create a full-H bridge through an injector coupled between two pins.

By providing the configuration/topology shown in FIG. 11a, the drive circuit may be operated in at least four different modes that provide support for both unipolar and bipolar Piezo technology, as well as unipolar and bipolar solenoid technology. Accordingly, the four operating modes may include unipolar solenoid, unipolar Piezo, bipolar Piezo, and bipolar solenoid. Referring to FIG. 11a, in case of a unipolar solenoid injector, the switching sequence for operating the circuit in FIG. 11a includes a first state, which may be considered a high voltage phase during which the solenoid is being charged to overcome the inductance of injector coil 1204. In this state, switch S3*b* is turned on, and switch S2*a* is driven by HV boost module 1202, e.g. by a PWM signal from module 1202 providing a power boost to increase the current until sufficient current has been obtained. Once the current is sufficient, it is maintained with a lower voltage in a second state, which is a low voltage phase. In this state switch S3b is turned on, and switch S1a is driven by the PWM signal having a sufficient duty-cycle value to maintain the current. It should be noted that switches not turned on are assumed to be turned off. In one embodiment, the switches shown in FIG. 11a are implemented as driving FET devices, with the driving (control) signal applied to the corresponding gate terminals of the FET devices. Once the injection sequence has completed, all the driving FETs may be turned off to close the injector 1204, for example by turning off the PWM signal, and switches S3a and S3b are turned on awaiting the next injection sequence.

Table 2 lists a number of switching sequences for the different injector configurations according to the injection technology used.

TABLE 2

Switching configuration for different injector drive modes

| Mode | Injection Phases |
|---|---|
| Unipolar Solenoid | S3b on, S2a PWM → S3b on, S1a PWM → off → S3a and S3b on. |
| Unipolar Piezo | S3b on, S2a PWM → off → S3b on, S3a PMW → off. |
| Bipolar Solenoid | S3b on, S2a PWM → S3b on, S1a PWM → S3a on, S1b PWM → S3a on, S2b PWM |
| Bipolar Piezo | S3b on, S3a PWM → S3a on, S2b PWM → off → S3a on, S3b PWM → S3b on, S1a PWM –> off |

Figure 11B:
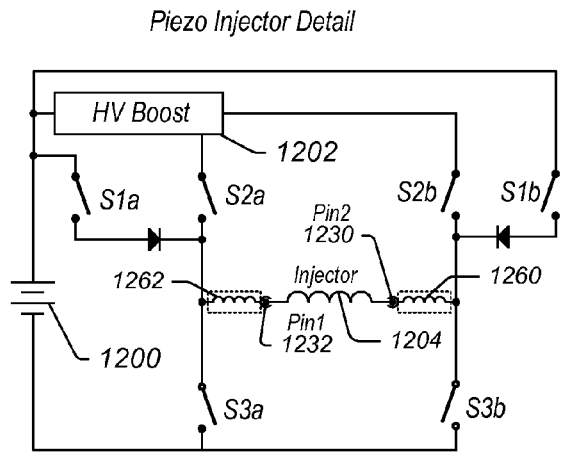
FIG. 11b shows a partial simplified circuit diagram of the embodiment of an H-bridge injector topology of FIG. 11a used with a Piezo injector.

The switching sequence for the unipolar solenoid has been described above. When using a unipolar Piezo injector or a Piezo injector in general, the configuration shown in FIG. 11a may be slightly modified as shown in FIG. 11b. In this case, inductors 1262 and 1260 may be coupled between each pin (1232 and 1230, respectively) and one corresponding terminal of injector 1204 as shown. The inductors 1262 and 1260 may not be used any of the solenoid modes, and may either be removed or be selected in such a way that they are sufficiently small compared to the solenoid injector's inductance, which is negligible. Thus, the switching sequence when using a unipolar Piezo injector includes a first state, considered a high voltage phase during which S3b is turned on, and switch S2a is driven by HV boost module 1202, e.g. by the PWM signal from module 1202 providing a power boost. In the second state the FETs are turned off, for example by turning off the PWM signal. In the third state, switch S3b is turned on, and switch S3a is driven by the PWM signal. Once the injection sequence has completed, all the driving FETs may be turned off again to close the injector 1204, for example by turning off the PWM signal.

For bipolar solenoid mode, the switching sequence includes a first state, which is high voltage phase during which the solenoid is being charged to overcome the inductance of injector coil 1204. In this state switch S3b is turned on, and switch S2a is driven by HV boost module 1202, e.g. by a PWM signal from module 1202 providing a power boost to increase the current until sufficient current has been obtained. Once the current is sufficient, it is maintained with a lower voltage in a second state, which is a low voltage phase. In this state switch S3b is turned on, and switch S1a is driven by the PWM signal having a sufficient duty-cycle value to drive the appropriate current, which may be varied as appropriate for the injector. In the third state, switch S3a is switched on, while switch S1b is being driven by the PWM signal. In the next state, which is again a high voltage phase, switch S3a is turned on, and switch S2b is driven by the PWM signal from module 1202 providing a power boost.

In the bipolar Piezo mode, HV Boost 1202 module is used exclusively. In the first state, switch Sb3 is turned on while switch S3a is driven by the PWM signal. In the next state, switch S3a is turned on while switch S2b is driven by the PWM signal. In the next state the driving FETs are turned off. Subsequently, switch S3a is turned on while switch S3b is driven by the PWM signal. In the following state, switch S3b is turned on while switch S1a is driven by the PWM signal, following which the driving FETs are turned off again.

Figure 12:
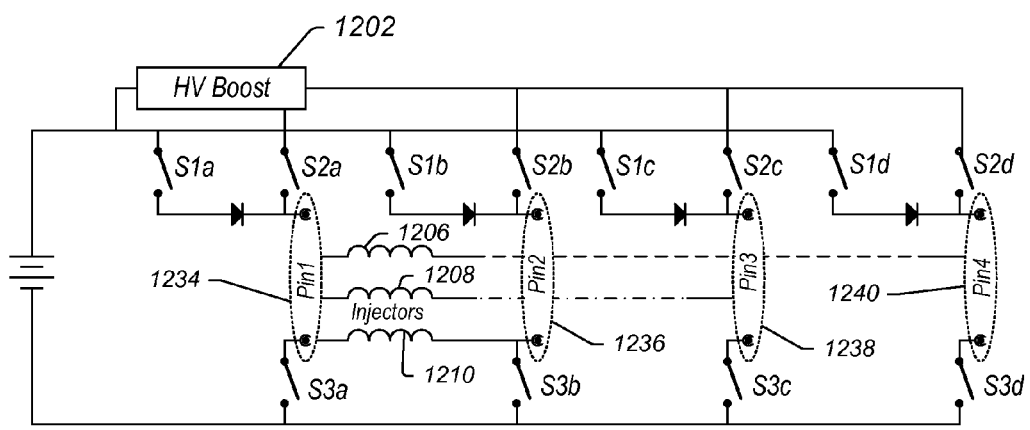
FIG. 12 shows a partial simplified circuit diagram of one embodiment of an H-bridge injector topology used in simple multiplexing.

FIG. 12 shows one embodiment of a novel H-bridge implementation for one set or multiplexed combination of three injectors and four pins shown in the multiplexing configuration of FIG. 5. For example, considering the first set of multiplexed injectors in FIG. 5, Pin1 1234 of FIG. 12 corresponds to Pin10 608 of FIG. 5, Pin4 1240 of FIG. 12 corresponds to Pin1 602 of FIG. 5, Pin3 1238 of FIG. 12 corresponds to Pin2 604 of FIG. 5, and Pin2 1236 of FIG. 12 corresponds to Pin3 606 of FIG. 5. Accordingly, as shown in FIG. 12, injector 1206 may be driven between (or through) Pin1 1234 and Pin4 1240, injector 1208 may be driven between Pin1 1234 and Pin3 1238, and injector 1210 may be driven between Pin1 1234 and Pin2 1236. The switching sequence for each injector may be performed similar to that shown in Table 2 above with reference to FIG. 11a according to drive type, using the appropriate corresponding pair of pins depending on which injector is being controlled. Thus, in the case of a unipolar solenoid drive, switches S1a, S2a, S3b, S3c, and S3d may not be used, while in the case of a Piezo drive, switches S3b, S3c, and S3d may not be used.

Figure 13:
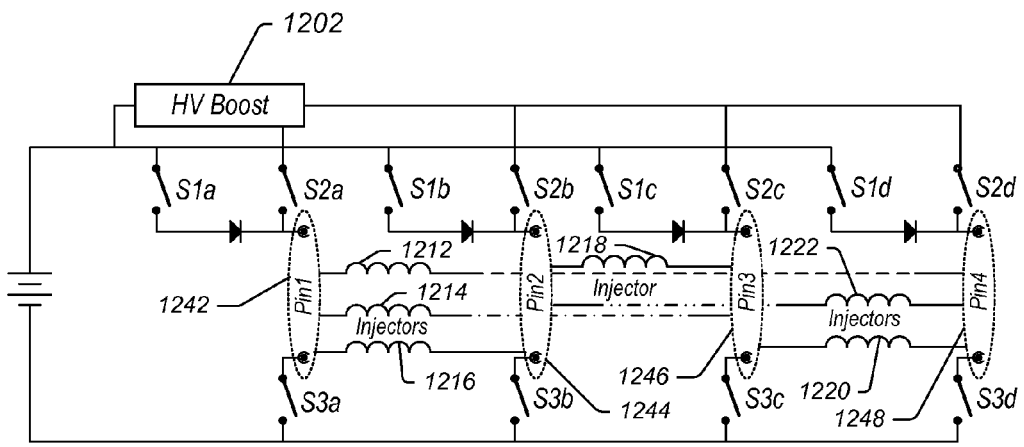
FIG. 13 shows a partial simplified circuit diagram of one embodiment of an H-bridge injector topology used in cross-multiplexing.

FIG. 13 shows one embodiment of a novel H-bridge implementation for the cross-multiplexing configuration of FIG. 8. Specifically, Pin1 1242 of FIG. 13 corresponds to Pin1 902 of FIG. 8, Pin2 1244 of FIG. 13 corresponds to Pin2 904 of FIG. 8, Pin3 1246 of FIG. 13 corresponds to Pin3 906 of FIG. 8, and Pin4 1248 of FIG. 13 corresponds to Pin4 908 of FIG. 8. Accordingly, as shown in FIG. 13, injector 1212 may be driven between (or through) Pin1 1242 and Pin4 1248, injector 1214 may be driven between Pin1 1242 and Pin3 1246, injector 1216 may be driven between Pin1 1242 and Pin2 1244, injector 1218 may be driven between Pin2 1244 and Pin3 1246, injector 1222 may be driven between Pin2 1244 and Pin4 1248, and injector 1220 may be driven between Pin3 1246 and Pin4 1248. The switching sequence for each injector may be performed similar to that shown in Table 2 above with reference to FIG. 11a according to drive type and the selected multiplexing configuration, using the appropriate corresponding pair of pins depending on which injector is being controlled. In this case all the switches may be used.

Various embodiments of the H-bridge configuration described herein (e.g. as shown in FIGS. 11a, 11b, 12, and 13) provide considerable advantages over present-day ECUs, which use different hardware setups to control solenoid and Piezo modes. In addition, the H-bridge hardware topology described herein, along with the flexibility of the control mechanism, e.g. FPGA (such as FPGA & CPU block 408 in FIG. 2), facilitates the use of injector drivers for driving non-injector actuators. For example, a specified number of pins may be combined to drive a stepper motor, and/or six pins may be combined to run a 3-phase motor, two pins may be combined to drive a DC motor, or two pins may be combined to drive peak-and-hold hydraulic and pneumatic valves. Therefore, the hardware configurations exemplified in FIGS. 11a, 11b, 12, and 13, used for implementing one or more of the cross-multiplexing topologies shown in FIGS. 5 through 10 facilitate the design and use of an FPGA-based drive electronics system to implement a variety of actuators (including but not limited to automotive actuators, hydraulic actuators, etc.) with a single hardware architecture.

Software Control of Multiple Injection Events

In one set of embodiments, a three-tier hierarchy of software may be developed to control injection events. The novel software hierarchy may facilitate precise control of all aspects of injections when the software is executed and/or implemented. For example, the software may be implemented in an FPGA (such as FPGA 408 in FIG. 2), or executed by a control unit (such as CPU 408 in FIG. 2), among others. Table 3 below summarizes the software structure according to one embodiment shown in FIG. 14.

TABLE 3

Software architecture summary

Figure 14:
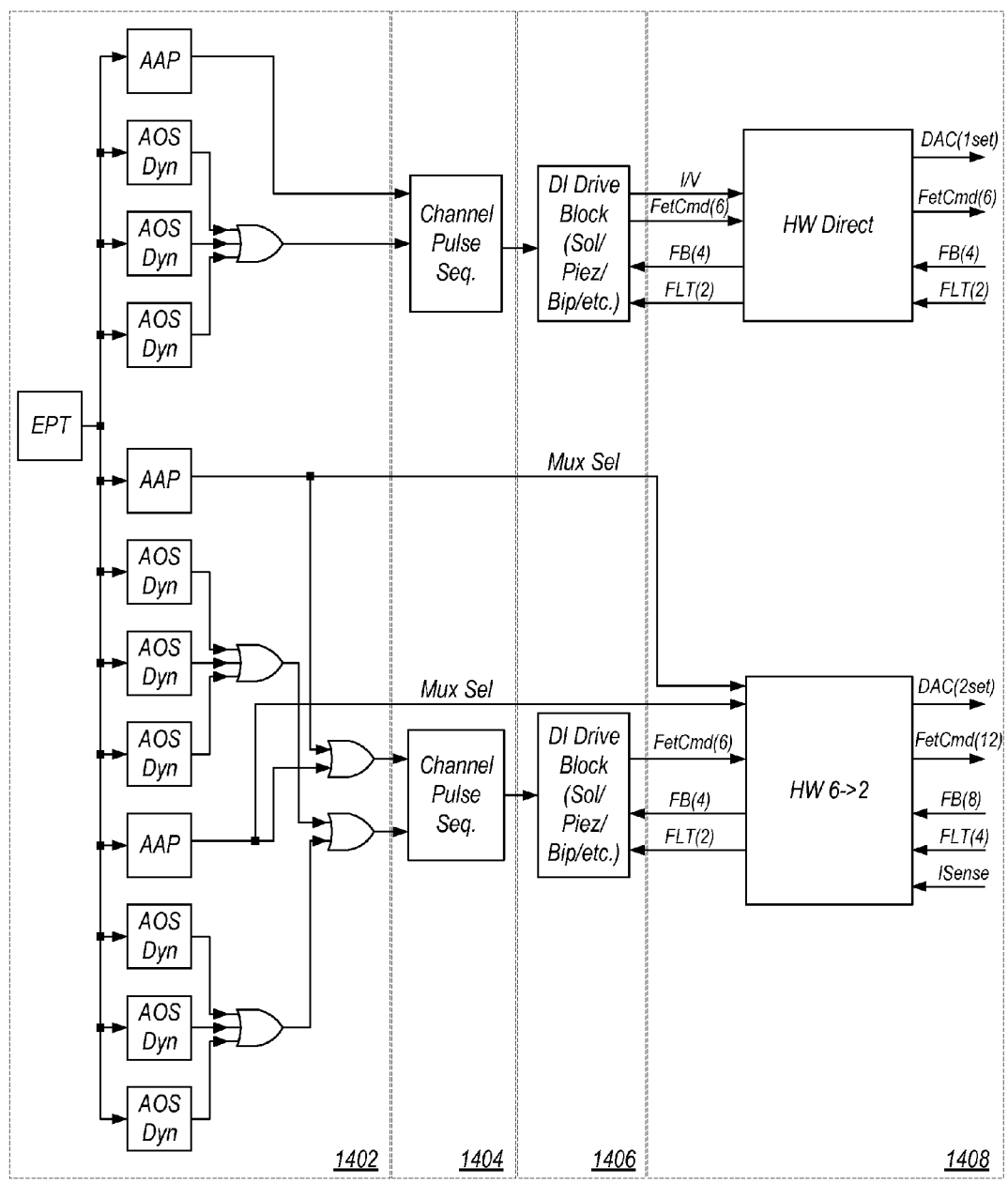
FIG. 14 shows a partial block diagram of one embodiment of a software layer architecture the injector control section of an ECU.

| Software Layer | Section in FIG. 14 | Function |
|---|---|---|
| Angle | 1402 | Time/angular windows for pulse sequences, and selecting physical channel |
| Sequence | 1404 | Defining the details of pulse sequences |
| Type | 1406 | Selecting the type of injector to control |
| Mux | 1408 | Mapping the pulse sequence to physical hardware |

The acronyms used in FIG. 14 are summarized in Table 4 below:

TABLE 4

Acronyms used in the diagram shown in FIG. 14

| Acronym | Expression | Description |
|---|---|---|
| AAP | Angle Angle Pulse | A pulse that starts and ends at defined engine angles |
| AOS | Angle One-Shot | A pulse that starts at a specific angle and lasts one clock cycle |
| Dyn | Dynamic | |
| Mux | Multiplexer | |
| EPT | Engine Position Tracking | Software that reads the cam & crankshafts and derives engine position, updates every clock cycle (25 ns in one embodiment) |
| DI | Direct Injection | |
| HW | Hardware | |

As indicated in Table 3, the software (SW) may be structured in four layers, each layer executed to perform a specific task or set of tasks. One embodiment of the SW structure is illustrated in FIG. 14, and includes an Angle layer 1402, a Sequence layer 1404, a Type layer 1406, and a Multiplexer layer 1408. In one set of embodiments, the SW and its layer structure may be implemented on an FPGA, in which case the top layer (1402 and 1404) may include several FPGA blocks. The Engine Position Tracking (EPT) block may be used to track engine position, which may include collecting information representative of the engine position, and used the collected information to generate a corresponding number of evenly spaced clock pulses that are then used to drive the angle blocks, shown as the second column of blocks in layer 1402 of FIG. 14. The Angle-Angle-Pulse (AAP) blocks may be used to define the windows, (or time periods, or specified periods of time) in which a sequence of injections may take place. Inside this sequence, a number of Angle-One-Shot (AOS) pulses may be generated to signify the beginning of a channel pulse sequence. Accordingly, the channel pulse sequences, or the detailed information/data required for the channel pulse sequences may be generated in layer 1404, which may therefore be considered the back-end of the overall top software layer. In other words, the required angle control signals may be generated in layer 1402, and the channel pulse sequences may be generated in layer 1404, based on the signals generated in layer 1402. In one sense, layer 1402 defines the time periods during which the fuel injection is to take place, and layer 1404 generates the fuel injection control commands (e.g. pulse sequences) active during the defined time periods.

The middle layer (1406) provides the interface to support the type of injector that is to be controlled, which may include defining the current and voltage profile that an injection command (received from layer 1404) supports. Accordingly, SW executing in layer 1406 may produce a series or list of injection profile phases, which allows the pulse profile to cycle through a series of different phases automatically. Layer 1406 is separate from layers 1402 and 1404 in order to allow for swapping out different middle layer blocks depending on the injection drive type used. This provides flexibility in providing SW drivers for different drive types without requiring altering any of the top level (layer 1402 and 1404) SW. For example, different SW blocks may be used in layer 1406 for unipolar Piezo, bipolar Piezo, unipolar solenoid and bipolar solenoid drivers, while layer 1402 and 1404 may remain unaltered for a given (engine) system. Therefore, executing SW layer 1406 results in the appropriate information/data provided to the bottom layer (1408), which may map that information/pulse sequence to physical hardware.

Figure 15:
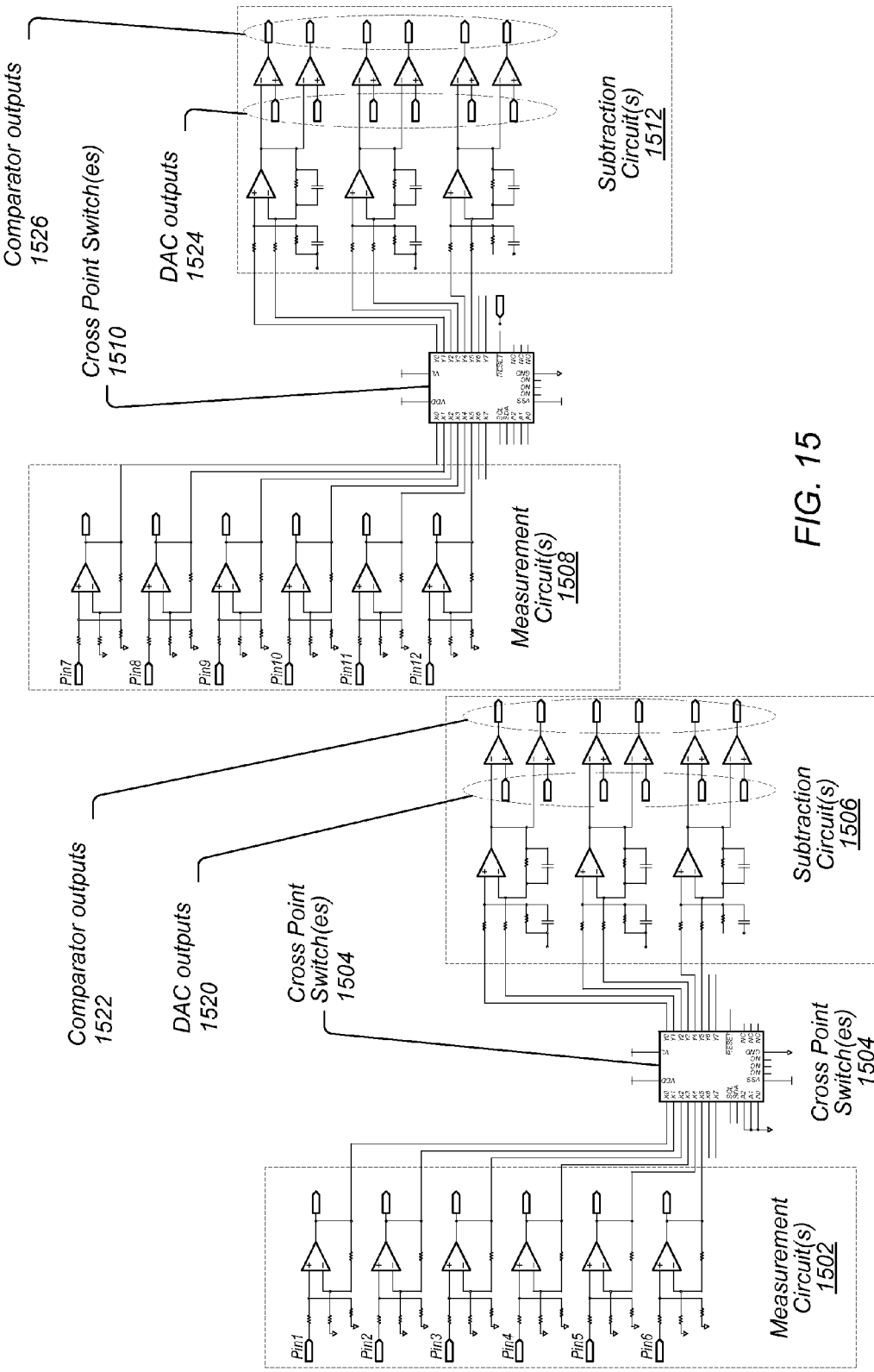
FIG. 15 shows a partial circuit diagram of one embodiment of a system that uses cross point switches for multiplexing measurements circuits.

The bottom layer (1408), then, is the hardware mapping layer in which the type of injector drive is selected, and the appropriate control signals corresponding to the respective hardware (HW) are generated based on the appropriate corresponding pulse sequences/data received from layer 1406. Layer 1408 may therefore handle the physical layer interface and the required multiplexing, applied, for example, to the injector/pin combinations as previously described in reference to FIGS. 5-13. The SW (or algorithms) in layer 1408 may be executed to send commands to the correct sets of drivers to control the switches (e.g. the switches shown in FIGS. 11*a*, 11*b*, 12, and 13), which may be implemented as FETs, and thus the signals are indicated in FIG. 14 as FetCmd. The SW in layer 1408 may also be executed to send commands to update the DAC and cross-point switches, and read back the correct diagnostics from both digital and analog inputs. The cross-point switches are shown in FIG. 15, and will be further discussed below. The DACs may be used to set the threshold values of the comparators within the subtraction circuits shown in FIG. 15, as will also be further discussed below. In some embodiments, current sense circuits (not shown) may also be connected between the low-side switches and ground (GND, or voltage reference), e.g. between switches S3*a/b/c/d* and GND in FIGS. 11*a*, 11*b*, 12, and 13, and additional DACs may be connected to these current sense circuits. The commands generated in layer 1408 may be sent to update any one or more of these cross-point switches and DACs as desired.

The SW structure embodied in FIG. 4, used in conjunction with the HW combinations discussed with regards to FIGS. 5-13 make possible a system that is sufficiently flexible to allow nearly any type of low-level injector drive hardware and multiplexing scheme without having a major impact on the top level code. Its modular architecture allows for major code re-use, and provides a more versatile and modular solution than the typical single layer approach implemented in present-day production ECUs.

Direct Injection (DI) Cross-Point Switching for Multiplexing Control

In order to accurately measure the voltage across a Piezo injector stack, for example for injectors 302 and 304 in FIG. 3 if those injectors are Piezo injectors, a differential voltage measurement may be required. The circuit in such a configuration includes an inductor-injector-inductor structure as shown in FIG. 11b (inductor 1262, injector 1204, inductor 1260), with the Piezo injector modeled as a capacitor yielding an inductor-capacitor-inductor structure. In such a structure, with the far ends of the inductors (1262 and 1260) being switched, rapid common mode changes are observed in the capacitor voltage, with both ends of the capacitor (i.e. both ends of the Piezo injector) changing voltage rapidly. Accordingly, instead of merely subtracting two channels in a multiplexed A/D converter (ADC), an analog subtraction may be performed.

The multiplexing setups previously described and exemplified in FIGS. 5-13 use discrete elements. However, providing discrete subtraction and comparison circuits for every permutation, i.e. for every possible pin/injector combination achieved through the cross-multiplexing topology, may be prohibitive. Therefore, in one set of embodiments, one measurement circuit may be provided per pin, and one subtraction circuit may be provided per H-bridge, that is, per injector. The insertion of a cross-point switch before the comparison circuit as shown in FIG. 15, allows for switching to the correct subtraction for any injector configured in the multiplexer. As shown in FIG. 15, cross-point switches 1504 are inserted between measurement circuits 1502 and subtraction circuits 1506, and cross-point point switches 1510 are inserted between measurement circuits 1508 and subtraction circuits 1512. Furthermore extra channels from one switch, e.g. switch 1504, may be daisy-chained to the next switch, e.g. switch 1510, to implement larger multiplexing schemes. In this manner, the voltage at any pin may be subtracted from the voltage at any other pin. For example, the voltage at Pin1 may be subtracted from the voltage at Pin8, the voltage at Pin2 may be subtracted from the voltage at Pin3, and so on and so forth.

As also shown in FIG. 15, with each measurement circuit (in 1502 and 1508), each pin may have a corresponding divide circuit to pull the voltage down to a level at which switches 1504 and 1510 can safely operate. The output of each divide circuit is provided to a corresponding input of the switches 1504 and 1510. The subtraction circuits 1506 and 1512 are connected at the far side of switches 1504 and 1510, respectively. As previously mentioned, one subtraction circuit may be used for each injector that may be on simultaneously, therefore the number of subtraction circuits equals half the number of pins. In one set of embodiments, DACs may be used to set threshold values for the comparators in subtraction circuits 1506 and 1512. This is shown in FIG. 15 as DAC outputs 1520 and DAC outputs 1524 being provided to corresponding comparators within subtraction circuits 1506 and 1512, respectively. For example, if the intent is to charge the Piezo injector to 150V, but the high voltage is capped at 200V, it is desirable to know when the cap reaches 150V, obtaining that information in less than 1 µs subsequent to having reached that 150V limit. Therefore, the DACs may be set to 150V multiplied by the divide ratio of the divider circuit. Consequently, when the Piezo voltage crosses the threshold, the comparator flips, which indicates the control logic—e.g. in the FPGA—to stop charging/discharging, and cycle to the next phase.

Accurately measuring the voltage across the Piezo stack is important for at least two reasons. Voltage monitoring may be required if the intent is to develop a voltage level that is less than the boost supply or battery voltage, in order to ascertain when the voltage has reached the desired charging level. Support for partial opening of a direct drive Piezo requires opening and maintaining the voltage at various set points, and stepping between those set points during the switching sequences described with respect to FIGS. 11-13 (for example).

It should be noted that while the necessary measurements may be accomplished with fast simultaneous sampling ADCs, it may not be possible to operate such ADCs in certain applications, where it may not be possible to perform the high-frequency filtering required with the topology described herein (e.g. in FIGS. 5-13) without a very fast and expensive ADC, which may possibly not operate correctly at high temperatures. Therefore, at least one advantage of using cross-point switches such as 1504 and 1510 to construct a flexible multiplexing circuit is the additional board space gained, and the cost savings that may be achieved.

For example, without using cross-point switches, the voltage of the pins would have to be measured with the ADC independently, and the subtraction would have to be performed digitally. Due to the high slew rates and noise, this would require simultaneously sampling ADCs, which would be costly. It would also require digital filtering to be performed in the FPGA, which would consume additional resources. Another alternative would be to use discrete analog subtraction circuits for all possible combinations as outlined in FIGS. 5-10, which would also be costly, and would require many A/D and digital pins from the control logic.

Boost Power Supply Sequencing

Figure 16:
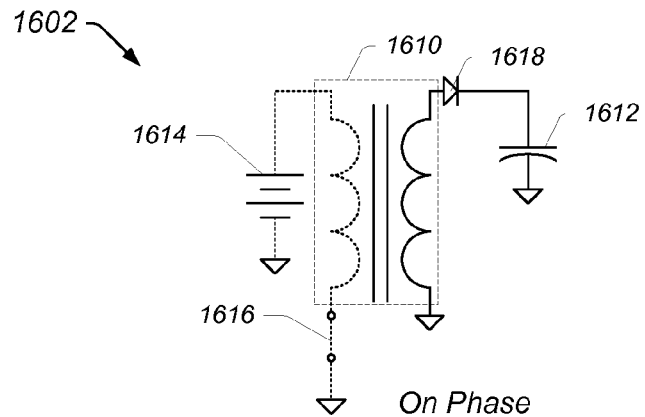
FIG. 16 shows a partial circuit diagram illustrating a power boost supply circuit in various phases of operation.
Figure 16:
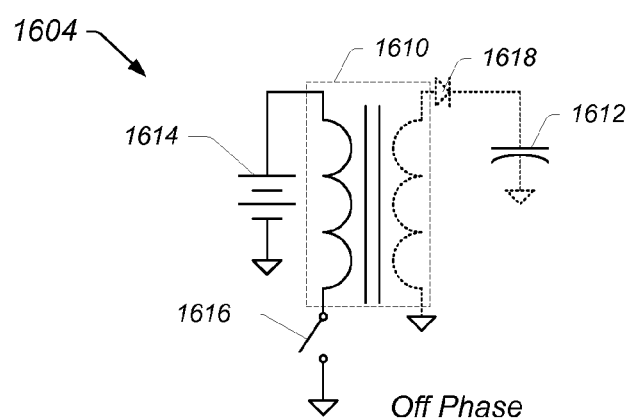
Figure 16:
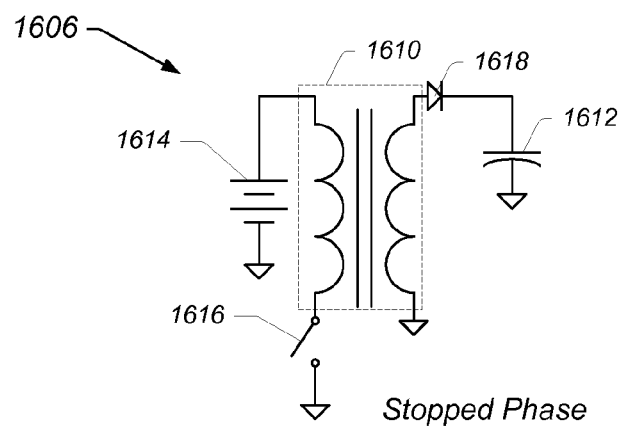

In some embodiments, boost power supply 406 in FIG. 2, and boost power supply 314 in FIG. 3 may each include a relatively large capacitor. The boost supply may charge up a capacitor as fast as possible, then maintain the charge to obtain a voltage that is within a specific voltage range for as long as necessary. Such a boost supply may be considered a larger version of similar circuits used in cameras to generate the necessary charge to operate a flash. FIG. 16 shows the circuit of one embodiment of a boost power supply circuit that includes an input power source 1614 (which may be a battery in preferred embodiments), a transformer 1610, a rectifier diode 1618, and a charge capacitor 1612. The supply may be operated via switch 1616 to selectively provide power to transformer 1610. In some embodiments, switch 1616 may be implemented as a FET or some other appropriate semiconductor/transistor device.

FIG. 16 depicts the different operating phases of the boost power supply. Depending on the state of switch 1616 and the energy stored in transformer 1610, the circuit may either operate in an On phase 1602, an Off phase 1604, or a Stopped phase 1606. In the On phase 1602, current is drawn from the battery 1614 through the primary (left) side of the transformer and through the switch 1616. In the Off phase 1604 the switch 1616 is opened and current stops flowing through the primary side of transformer 1610. The stored energy in the transformer is then transferred from the secondary (right-hand side) winding through diode 1618 to the high voltage charge capacitor(s) 1612 during the Stopped phase 1606. As soon as the energy from the transformer 1610 is transferred to capacitor 1612, that is, the energy in the secondary winding of transformer 1610 is depleted, the circuit is returned to the On phase 1602. This cycle is repeated until the capacitor 1612 reaches its desired state of charge, or in other words, the desired voltage value.

In order to use commercial off-the-shelf magnetic components, and reduce current ripple in the external power draw, the single supply (e.g. the single supply 406 in FIG. 2, and/or boost power supply 314 in FIG. 3) may be split into four identical sub-supplies. That is, the supply shown in FIG. 16 may now be considered as one of four identical sub-supplies, with the output current provided by four supplies combined to obtain the total output current. In the On phase 1602, the current may ramp up until a preset current threshold is reached, depending on the magnetic used. This threshold may trigger the switching command to turn off, i.e. to turn off switch 1616. Switch 1616 may remain turned off until two conditions are met. The first condition is met once the energy has been discharged from the coil in transformer 1610, which may be detected by the transformer flyback voltage. The second condition is met once the minimum time has been met to achieve 90° phase separation in a switching order of the power supplies, based on a total time period during which all four supplies will have been turned on. This time may be calculated by measuring the A phase period and dividing it by four, and adding that much delay to each of the subsequent phases. Since the device is always charging after it is switched back on, the subsequent periods are always slightly shorter, making this algorithm simple and stable. With every firing of the A phase, the period may be updated.

Therefore, the supplies are balanced such that they are switched staggered 90° out of phase, which may be difficult because the pulse-width of the phase changes as a function of the input voltage and boost capacitor voltage. However, this setup provides the advantage of limiting the total current draw of the circuit, making it appear as if the system were running at four times (4×) the speed. Each phase of the circuit may pulse up to a specified current value, for example 20 A. If the pulses were all in-phase, the maximum current draw would be four times the specified current value, for example 80A for a specified current value of 20 A, and would require larger connectors and board space. With the out-of-phase current draw, currents of 20 A+13.3 A+6.6 A+0 A=40 A may be obtained if the specified current value limit for each circuit is 20 A.

Figure 17:
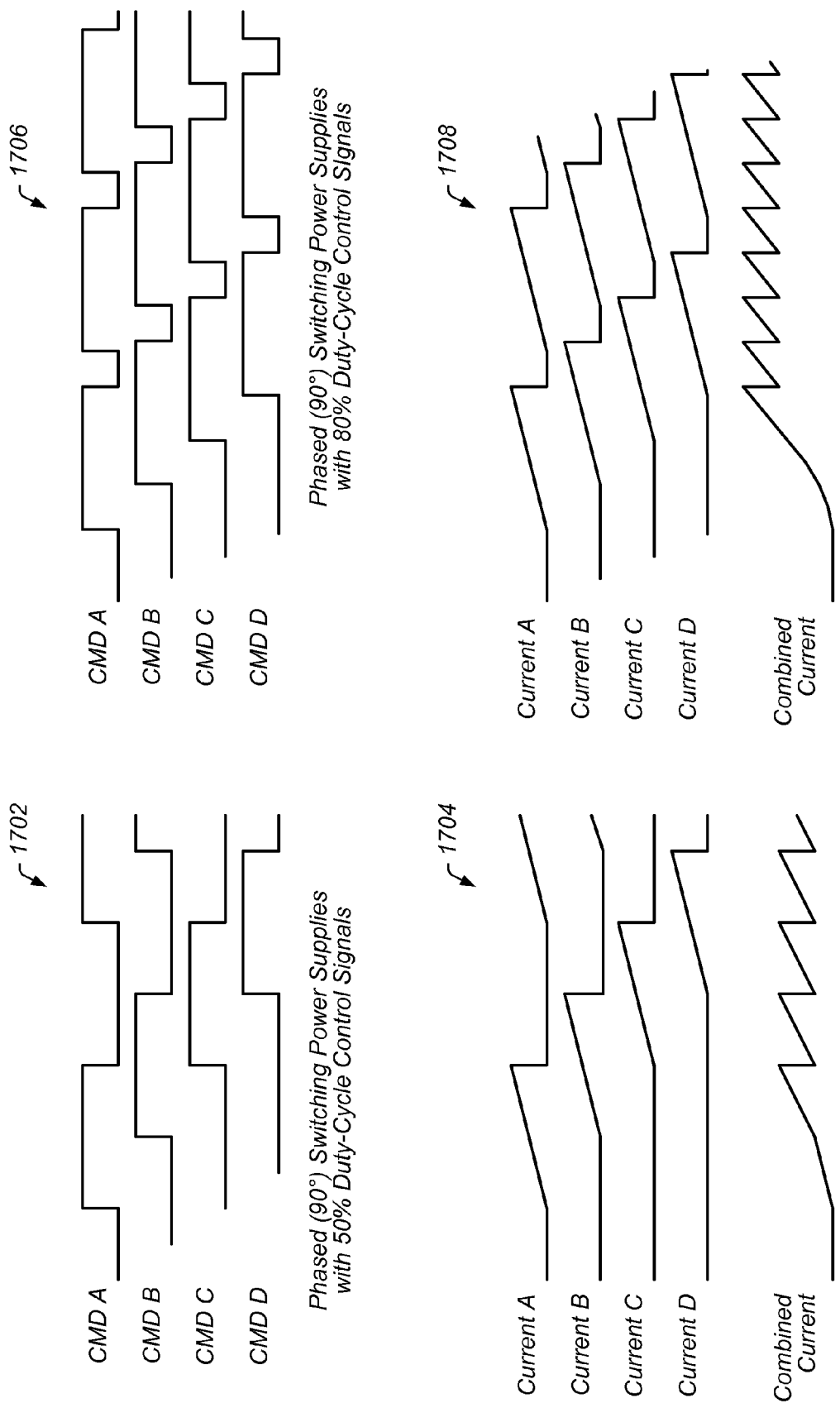
FIG. 17 shows a partial timing diagram of the switching commands applied to four phase-staggered boost supplies, and the currents produced by the boost supplies.

One example of possible switching sequences applied to four power supplies—each power supply exemplified by the power supply shown in FIG. 16—is illustrated in FIG. 17. CMD A, CMD B, CMD C, and CMD D represent the respective control signals applied to a corresponding respective switch (such as switch 1616 in FIG. 16) in one of four similar or identical power supplies. As mentioned above, each power supply may pulse up to a specified maximum current value, as exemplified by current pulses Current A, Current B, Current C, and Current D in FIG. 17. When switching the power supplies 90° out of phase, as indicated by switching waveforms CMD A, CMD B, CMD C, and CMD D, the combined current appears as shown in FIG. 17.

Graph 1702 represents switching the four power supplies 90° out of phase with respect to each other (power supplies switched out of phase with respect to each other, e.g. 90° out of phase, are also referenced herein as phased power supplies) with a 50% duty-cycle for each control signal, resulting in the current waveforms shown in graph 1704. Graph 1706 represents switching the four power supplies 90° out of phase with respect to each other, with an 80% duty-cycle for each control signal (again, each control signal controlling a respective switch 1616 in a respective one of the four power supplies), resulting in the current waveforms shown in graph 1708. As observed in each graph (1704 and 1708), the current ripples on the combined current waveform(s) are reduced, and the overall value of the combined current is increased by increasing the duty-cycle of each control signal while continuing to control the four power supplies in a staggered (phased) manner. If all four supplies were switched at the same time, the current would ramp up to 80 A, then drop to 0 when the switches (1616) are switched off. By keeping the power supplies switching out of phase with respect to each other, only one power supply is switched at a time, while still maintaining a specified (e.g. minimum identified) average current draw, so smaller supplies may be used.

Programmable Protected Input Circuit

For configurable automotive inputs, it may be desirable to accommodate sensor types that need pull-up and pull-down circuits. It may also be necessary to overcome battery voltage short-circuits, which at times may be intentionally created by using the pins as a switch to the positive terminal of the battery (e.g. Batt+ terminal of battery 306 shown in FIG. 3). With a conventional FET switch for the pull-up to the supply voltage, which may be 5V, the body diode typically reverses conduct right back to the power supply. Therefore, an input protection method may be implemented, in which software may be executed to switch a pull-up to 5V for an input that may be shorted to a voltage greater than 5V, with a simple p-channel FET. In one set of embodiments, a push-pull power supply design may be used to absorb the higher voltage without problems.

Figure 18:
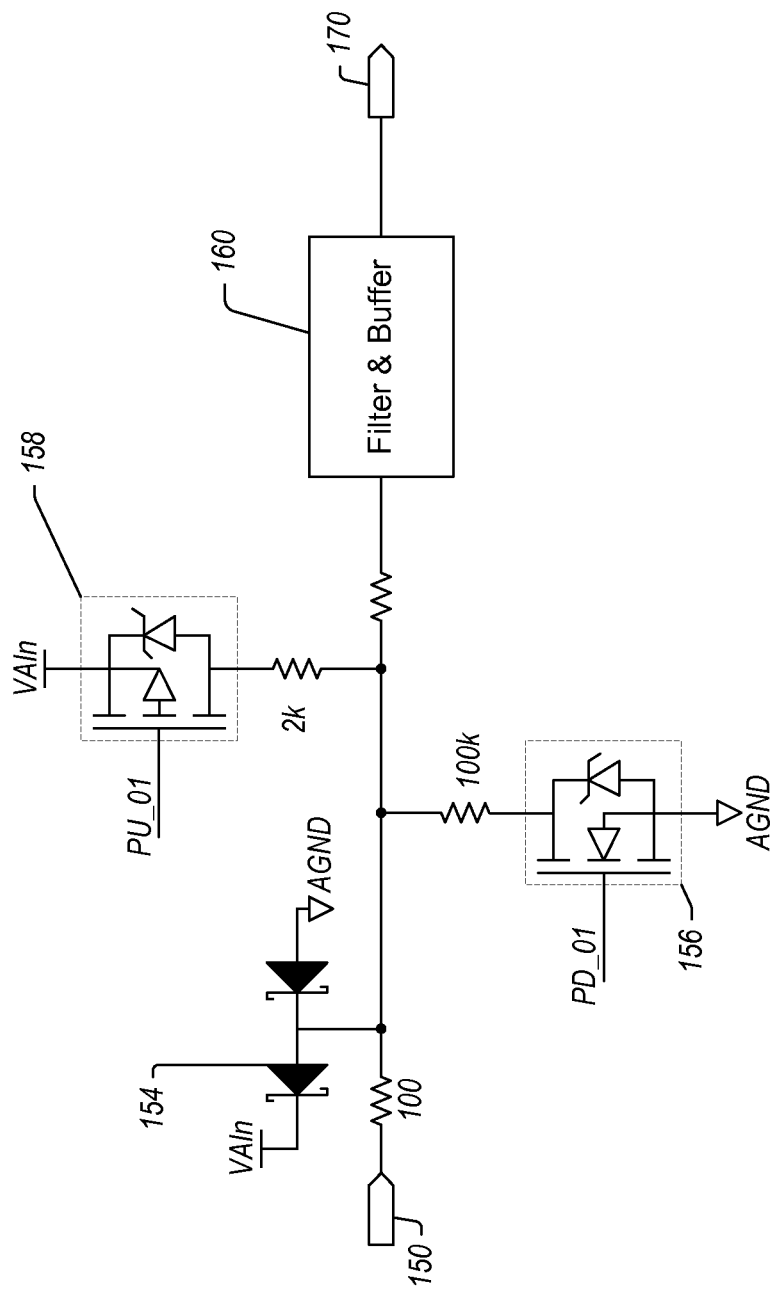
FIG. 18 shows a partial circuit diagram of one embodiment of an analog input protection circuit.

One embodiment of analog input protection circuit is shown in FIG. 18. Input is provided to node 150, with the output provided at node 170 at the output of filter and buffer block 160. In one set of embodiments, the circuit shown in FIG. 18 may be used to protect the pins use in an engine controller system to couple to the injectors. Thus, input node 150 may be coupled to the pin, and node 170 may be coupled to the internal circuitry intended to interface with the pin. The values for the various resistors and capacitors are exemplary for the given embodiment, and are shown for illustrative purposes only. As seen in the circuit shown in FIG. 18, semiconductor device 158 (which is a p-channel FET in the embodiment shown) is used to pull the circuit up to the reference voltage VAin, which may be 5V, when desired. Overall, the pin (coupled to node 150) may experience high voltage levels (e.g. 32V), with transients that may exceed twice the expected voltage levels (e.g. transients of up to 72V in some embodiments), as well as negative voltage and electrical noise. Therefore, the voltage for the internal circuitry interfacing with the pin through node 170 is filtered through filter and buffer block 160, and protected to remain within specified safe levels, for example between 0V and 5V as exemplified in the embodiment shown in FIG. 18. In case of a short to the battery, current may flow through diode 154 and semiconductor device 158 to VAin. However, it is desirable to prevent this current from appreciably moving the voltage level of VAin. Thus, a power converter (or regulator) may be used to regulate the voltage VAin to the stable desired level. However, using a standard buck converter or linear power supply may simply allow the voltage Vain to continue to climb, which is highly undesirable.

Figure 19:
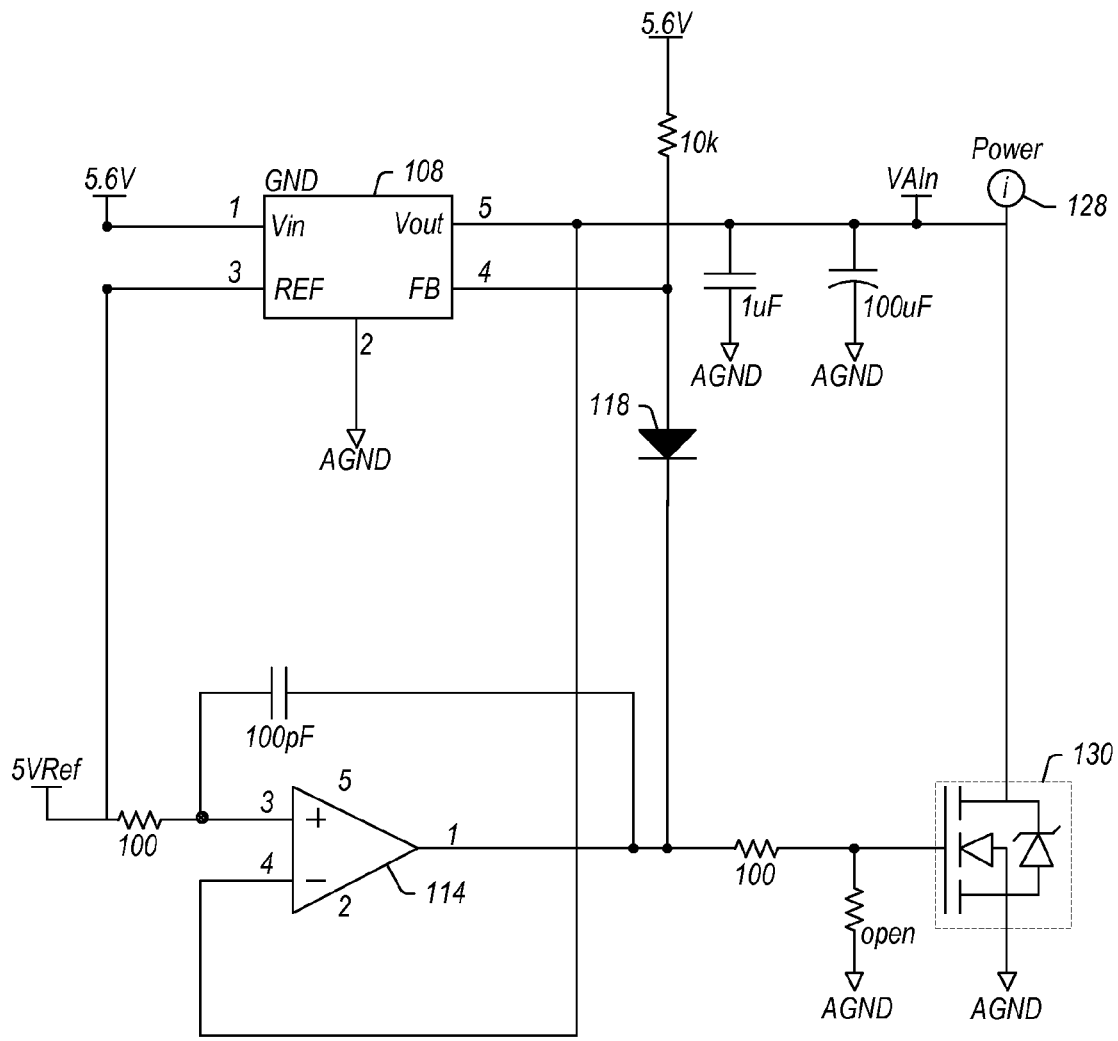
FIG. 19 shows a partial circuit diagram of one embodiment of a push-pull asymmetric power supply used to dissipate extra energy provided to the circuit of FIG. 18 when the input pin is coupled to a higher voltage (e.g. a battery).

FIG. 19 shows the partial circuit diagram of one embodiment of a push-pull power supply, which may be used to provide the VAin voltage to device 158 and diode 154 in FIG. 18. The push-pull power supply shown in FIG. 19 allows the supply to dissipate any excess voltage by burning it off in semiconductor device 130. The circuit may include a power supply regulator core 108, receiving an input supply voltage, which is shown as 5.6V for illustrative purposes. The supply shown in FIG. 19 is asymmetric because the amount of energy to be dissipated even in a worst case scenario far exceeds the amount of energy needed to be supplied to the sensors through pull-ups. This allows software selectable pull-ups to 5V, and continuous shorts on neighboring channels that share the same supply. The system may include only a single 5V supply and many (e.g. 32) analog inputs. In case of a conventional analog 5V supply, providing an insufficient load current, and driving the input to a high voltage, e.g. 32V, by a switch to BATT+ (referring again to system 300 and battery 306, for example), may cause the 5V supply rail to rise above 5V. This may damage the circuit, and may lead to developing the wrong voltage as a reference other channels that count on that rail voltage having a 5V value.

The circuit in FIG. 19 in conjunction with a software switchable pull-up to 5V (or to any specified voltage as desired based on the overall system requirements) provides full flexibility on all analog input channels without requiring physically opening boxes to flip switches, or worrying about the effects that a short developed on one channel may have on another channel. The pull-up to 5V may be mutually exclusive with a switch input to BATT+ (referring again to system 300 and battery 306). In a typical automotive circuit, devices 156 and 158—shown in FIG. 18 as transistor devices—may simply be direct wires and the 2 k and 100 k resistors may be included only on the channels that require them. In the flexible circuit disclosed herein, these values may be selected by software, and to compensate for the reduced effectiveness of semiconductor switches at stopping current flow when contrasted with respect to effectiveness of mechanical switches, the circuit described in FIG. 19 may be used to provide the voltage VAin.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A drive circuit comprising:
   a plurality (N) of pins, each pin of the N pins configured to couple to an actuator; and
   a plurality (M) of switches;
   wherein each pin of the N pins is coupled to:
      a different respective low-side switch of the M switches; and
      a different respective set of high-side switches of the M switches;
   wherein the switches are configured to be selectively operated to control a specified number of actuators according to:
      a multiplexing configuration that defines a connectivity between at least a subset of pins of the N pins and the specified number of actuators; and
      actuator type of each actuator of the specified number of actuators.

2. The drive circuit of claim 1, wherein any pair of pins of the N pins and an actuator coupled across the any pair of pins together form a respective H-bridge circuit.

3. The drive circuit of claim 1, wherein the M switches are field effect transistors (FETs) configured to be controlled through their respective gate terminals.

4. The drive circuit of claim 1, wherein the actuator type is one or more of:
   3-phase motor;
   stepper motor;
   hydraulic valve;
   pneumatic valve;
   unipolar solenoid injector;
   unipolar Piezo injector;
   bipolar solenoid injector; or
   bipolar Piezo injector.

5. The drive circuit of claim 1, wherein at least one switch of the different respective set of high-side switches is configured to couple to a boost power supply configured to deliver a power boost when the at least one switch is closed.

6. The drive circuit of claim 1, wherein at least one switch of the different respective set of high-side switches is configured to couple to a power terminal of a power supply configured to deliver steady power when the at least one switch is closed.

7. The drive circuit of claim 1, wherein the respective low-side switch is configured to couple to a reference terminal of a power supply configured to deliver steady power.

8. A control system comprising:
   a plurality (K) of actuators; and
   a drive circuit comprising:
      a plurality (N) of pins, each pin of the N pins configured to couple to an actuator of the K actuators; and
      a plurality (M) of switches;
      wherein each pin of the N pins is coupled to:
         a different respective low-side switch of the M switches; and
         a different respective set of high-side switches of the M switches;
      wherein the switches are configured to be selectively operated to control at least a subset of actuators of the K actuators according to:
         a multiplexing configuration that defines a connectivity between at least a subset of pins of the N pins and the at least a subset of actuators; and
         actuator type of each actuator of the at least a subset of actuators.

9. The control system of claim 8, wherein any pair of pins of the N pins and an actuator of the K actuators coupled across the any pair of pins together form a respective H-bridge circuit.

10. The control system of claim 8, wherein the M switches are field effect transistors (FETs).

11. The control system of claim 8, further comprising a control module configured to:
    specify the multiplexing configuration; and
    generate control signals that selectively control the M switches.

12. The control system of claim 11, wherein the control signals are pulse-width modulated (PWM) signals.

13. The control system of claim 8, wherein the actuator type is one or more of:
    3-phase motor;
    stepper motor;
    hydraulic valve;
    pneumatic valve;
    unipolar solenoid injector;
    unipolar Piezo injector;
    bipolar solenoid injector; or
    bipolar Piezo injector.

14. The control system of claim 8, further comprising:
    a boost power supply coupled to at least one switch of each different respective set of high-side switches, and configured to deliver a power boost when the at least one switch is closed.

15. The control system of claim 8, further comprising:
    a power supply having a power terminal coupled to at least one switch of each different respective set of high-side switches, and configured to deliver steady power when the at least one switch is closed.

16. The control system of claim 8, further comprising:
a power supply having a reference terminal coupled each respective low-side switch, and configured to deliver steady power.

17. A method for controlling different types of actuators, the method comprising:
controlling a specified number (K) of actuators through a specified number (N) of pins by selectively controlling a plurality of switches according to:
a multiplexing configuration that defines a connectivity between the N pins and the K actuators; and
actuator type of each of the K actuators;
wherein each pin of the N pins is coupled to:
a different respective low-side switch of the plurality of switches; and
a different respective set of high-side switches of the plurality of switches.

18. The method of claim 17, wherein the actuator type is one or more of:
3-phase motor;
stepper motor;
hydraulic valve;
pneumatic valve;
a unipolar solenoid injector;
a unipolar Piezo injector;
a bipolar solenoid injector; or
a bipolar Piezo injector.

19. The method of claim 17, wherein the K actuators comprise at least two of:
a unipolar solenoid injector;
a unipolar Piezo injector;
a bipolar solenoid injector; or
a bipolar Piezo injector.

20. The method of claim 17, wherein any pair of pins of the N pins and an actuator of the K actuators coupled across the any pair of pins together form a respective H-bridge circuit.

21. The method of claim 17, wherein the plurality of switches are field effect transistors (FETs), wherein said controlling the plurality of switches comprises controlling the FETs through their respective gates.

22. The method of claim 21, wherein said controlling the FETs through their respective gates comprises driving the respective gate of at least a subset of the FETs with a pulse-width modulated signal.

23. The method of claim 17, wherein at least one switch of the different respective set of high-side switches is coupled to a boost power supply;
wherein the method further comprises delivering a power boost to a respective actuator of the K actuators coupled to a respective pin of the N pins that is coupled to the at least one switch, by closing the at least one switch.

24. The method of claim 17, wherein at least one switch of the different respective set of high-side switches is coupled to a power supply;
wherein the method further comprises delivering steady power to a respective actuator of the K actuators coupled to a respective pin of the N pins that is coupled to the at least one switch, by closing the at least one switch.

25. The method of claim 17, wherein the respective low-side switch is configured to couple to a reference terminal of a power supply configured to deliver steady power.

* * * * *